(12) United States Patent
Reeves et al.

(10) Patent No.: US 11,418,940 B1
(45) Date of Patent: Aug. 16, 2022

(54) MITIGATION OF DENIAL OF SERVICE ATTACKS ON EMERGENCY SERVICES

(71) Applicant: T-MOBILE INNOVATIONS LLC, Overland Park, KS (US)

(72) Inventors: Raymond Reeves, Oviedo, FL (US); Mark Peden, Paola, KS (US); Lena Webb, Overland Park, KS (US); LaReash Bridges, Kansas City, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 16/891,240

(22) Filed: Jun. 3, 2020

(51) Int. Cl.
*H04W 64/00* (2009.01)
*H04L 43/16* (2022.01)
*H04W 4/90* (2018.01)
*H04L 9/40* (2022.01)
*H04M 3/533* (2006.01)

(52) U.S. Cl.
CPC ............ *H04W 4/90* (2018.02); *H04L 43/16* (2013.01); *H04L 63/1458* (2013.01); *H04M 3/533* (2013.01); *H04W 64/00* (2013.01)

(58) Field of Classification Search
CPC ....... H04W 4/90; H04W 76/50; H04W 80/10; H04W 8/06
See application file for complete search history.

(56) References Cited

U.S. PATENT DOCUMENTS

| | | | |
|---|---|---|---|
| 9,197,666 B2 * | 11/2015 | Carney | H04L 63/1458 |
| 10,104,237 B1 * | 10/2018 | Amin | H04L 65/1016 |
| 10,887,342 B2 * | 1/2021 | Thompson | H04L 63/1458 |
| 2013/0219502 A1 * | 8/2013 | Danford | H04L 63/1458 726/23 |
| 2013/0285855 A1 * | 10/2013 | Dupray | G01S 5/0278 342/451 |
| 2014/0162582 A1 * | 6/2014 | Daly | H04M 3/5116 455/404.1 |
| 2016/0294871 A1 * | 10/2016 | Huston, III | H04L 63/1458 |
| 2017/0126345 A1 * | 5/2017 | Testicioglu | H04L 47/6215 |
| 2019/0116230 A1 * | 4/2019 | Schwab | G06F 16/29 |

FOREIGN PATENT DOCUMENTS

WO  WO-2019168418 A1 * 9/2019 ............ H04M 3/436

* cited by examiner

*Primary Examiner* — Liton Miah

(57) ABSTRACT

Systems and methods are provided for mitigating denial of service attacks in a communications network. Based on a determination that requests to access an E11 resource exceeds a threshold, it may be determined that a denial of service attack attempt is occurring. One or more mitigation protocols can be used to block, filter, or re-route attempts that are associated with the denial of service attack. Association with the denial of service attack can be identified based on a distance between the user devices associated with the requests and a time period for which the requests were originated.

20 Claims, 3 Drawing Sheets

MITIGATION OF DENIAL OF SERVICE ATTACKS ON EMERGENCY SERVICES

SUMMARY

The present disclosure is directed, in part, to mitigating denial of service attacks on emergency services, substantially as shown in and/or described in connection with at least one of the figures, and as set forth more completely in the claims.

In aspects set forth herein, one or more mitigation protocols takes place in response to determinations or observations of an ongoing denial of service attack on a telecommunication service or network. Generally, telecommunication networks, including wireless telecommunication networks allow users to access various services (e.g., voice service, data service, priority service). Telecommunication networks typically include several chokepoints, where congestion, whether routine, unintentionally disruptive, or hostile can degrade or prevent users from accessing a particular service. One example of such services are priority telecommunication services such as E11 services (i.e., three digit shortcuts to reach special services). Exemplary E11 services include 911 emergency services, 311 non-emergency police or other government services, 511 traffic and transportation services, 411 information and directory services, and the like. Unfortunately, network components that provide access or routing for user devices to such services can become congested in times of high traffic or when subject to denial of service attacks, to the point where the desired service is unavailable.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein.

DETAILED DESCRIPTION

Figure 1:
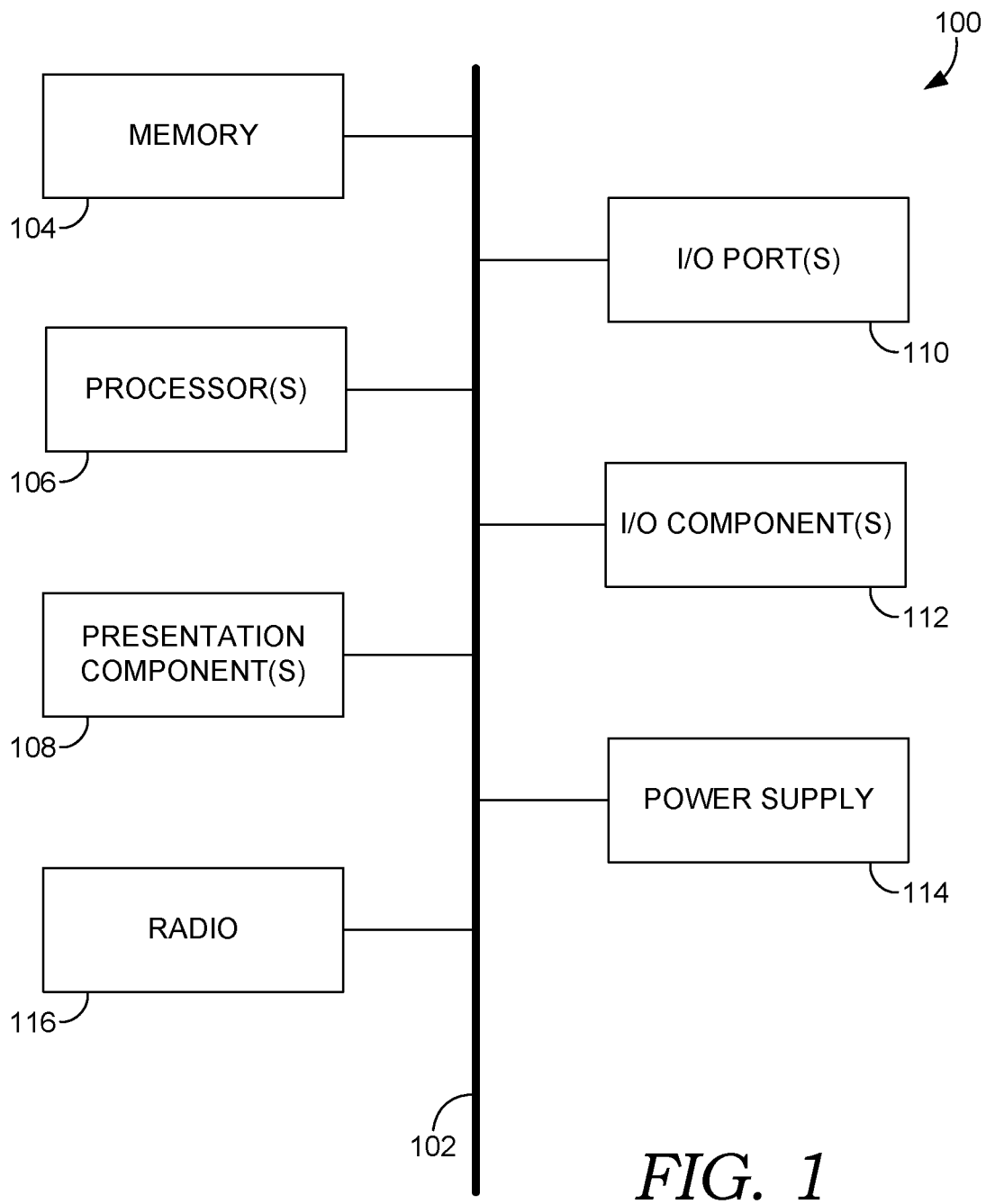
FIG. 1 is a diagram of a computing environment suitable for use in implementations of the present disclosure.

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
CD-ROM Compact Disk Read Only Memory
CDMA Code Division Multiple Access
eNodeB Evolved Node B
GIS Geographic/Geographical/Geospatial Information System
gNodeB Next Generation Node B
GETS Government Emergency Telecommunication Service
GPRS General Packet Radio Service
GSM Global System for Mobile communications
DVD Digital Versatile Discs
EEPROM Electrically Erasable Programmable Read Only Memory
LED Light Emitting Diode
LTE Long Term Evolution
MIMO Multiple Input Multiple Output
PC Personal Computer
PCS Personal Communications Service
PDA Personal Digital Assistant
PIN Personal Identification Number
RAM Random Access Memory
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SIP Session Initiation Protocol
SNR Transmission-to-noise ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable with UE)
WPS Wireless Priority Service Further, various technical terms are used throughout this description. An illustrative resource that fleshes out various aspects of these terms can be found in Newton's Telecom Dictionary, 31st Edition (2018).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, wireless telecommunication networks provide access for a user device (e.g., a UE) to access one or more network services. In some aspects, the desired telecommunication service may be an emergency communication service (e.g., E911, and the like).

Unfortunately, telecommunication services are often targeted, whether inadvertently or deliberately, by actions that could compromise their intended purpose. For example, a hostile actor could launch a coordinated and deliberate attack on the service in order to deny or degrade valid service usage, which has the effect of busying the service and preventing the service from serving valid traffic. Generally, anomalous behavior may be identified by identifying a number of devices initiating access requests within a predetermined distance of one another within a specified period of time.

Accordingly, a first aspect of the present disclosure is directed to a system for mitigating denial of service attacks on services in a communications network. The system comprises one or more nodes, each of the one or more nodes configured to wirelessly communicate with one or more user devices in a geographic service area; and one or more processors configured to perform operations. The operations comprising: receive a plurality of requests from one or more user devices to access an E11 resource; identify that a first set of requests within the plurality of requests satisfy a utilization threshold, wherein the utilization threshold indicates a maximum number of requests generated from a geographical area within a predetermined time period that can access the E11 resource; and generate an instruction to re-route the first set of requests to a destination other than the E11 resource.

A second aspect of the present disclosure is directed to a method for mitigating denial of service attacks of a telecommunication service. The method comprises receiving a plurality of requests from one or more user devices to access an E11 resource; identifying that a first set of requests within the plurality of requests satisfy a utilization threshold, wherein the utilization threshold indicates a maximum number of requests generated from a geographical area within a predetermined time period and within a predetermined distance from one another that can access the E11 resource; and generating an instruction to re-route the first set of requests to a destination other than the E11 resource.

According to another aspect of the technology described herein, a non-transitory computer readable media, having instructions stored thereon, that, when executed by one or more processors, cause the one or more processors to carry out a method a method for mitigating a denial of service attack. The method comprises receiving a plurality of requests from one or more user devices to access an E11 resource; identifying that a first set of requests within the plurality of requests satisfy a utilization threshold, wherein the utilization threshold indicates a maximum number of requests generated from a geographical area within a predetermined time period that can access the E11 resource; and generating an instruction to re-route the first set of requests to a destination other than the E11 resource.

Referring to FIG. 1, a diagram is depicted of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE, WCD, or other user device, capable of two-way wireless communications with an access point. Some non-limiting examples of the computing device 100 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

Radio 116 represents a radio that facilitates communication with a wireless telecommunications network. In aspects, the radio 116 utilizes one or more transmitters, receivers, and antennas to communicate with the wireless telecommunications network on a first downlink/uplink channel. Though only one radio is depicted in FIG. 1, it is expressly conceived that the computing device 100 may have more than one radio, and/or more than one transmitter, receiver, and antenna for the purposes of communicating with the wireless telecommunications network on multiple discrete downlink/uplink channels, at one or more wireless nodes. Illustrative wireless telecommunications technologies include CDMA, GPRS, TDMA, GSM, and the like. Radio 116 might additionally or alternatively facilitate other types of wireless communications including Wi-Fi, WiMAX, LTE, or other VoIP communications. As can be appreciated, in various embodiments, radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
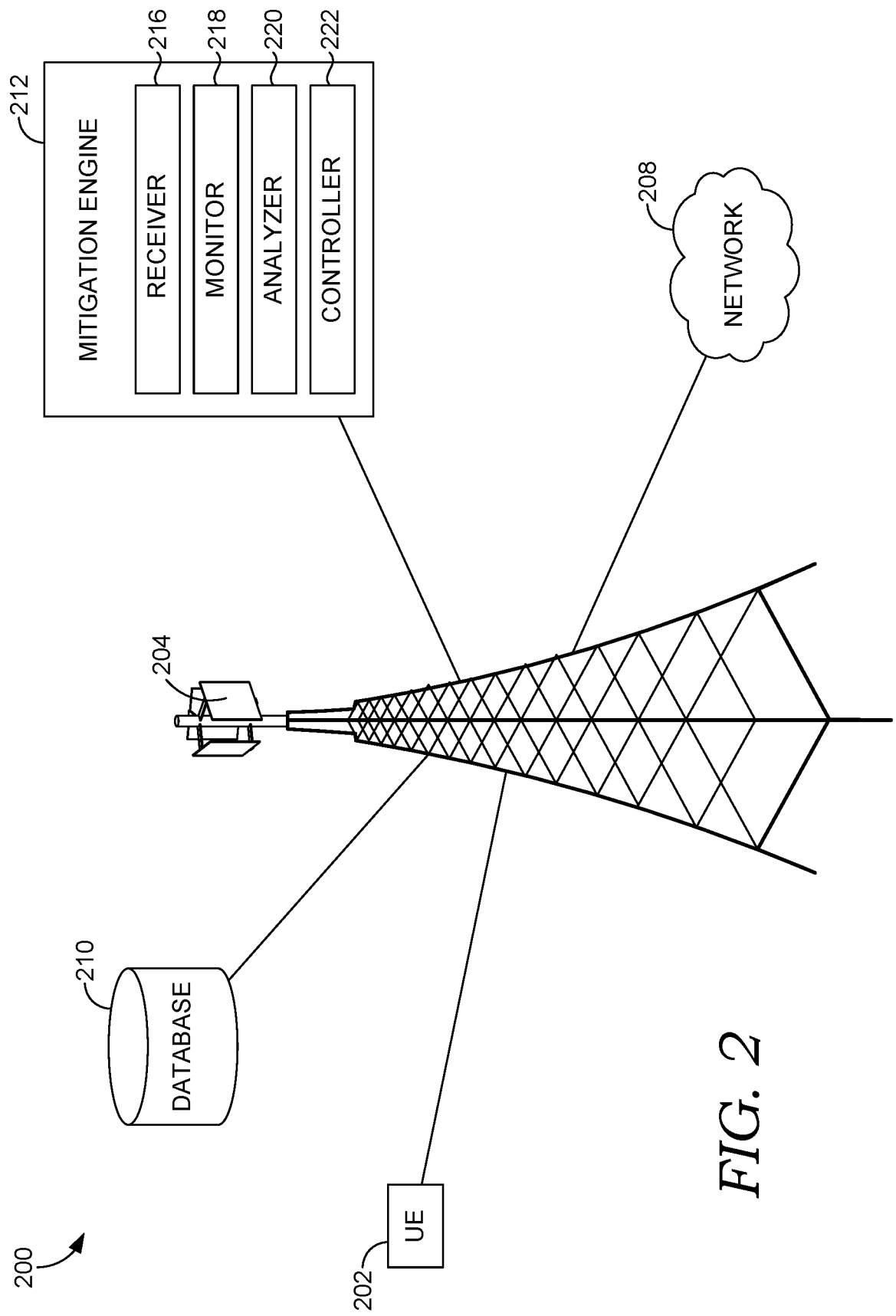
FIG. 2 illustrates a network environment in which implementations of the present disclosure may be employed.

FIG. 2 provides an exemplary network environment in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 includes user device 202, a node 204, network 208, database 210, and a mitigation engine 212. In network environment 200, the user device 202 can take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 100) that wirelessly communicates with a node of the wireless network, such as the node 204, in order to interact with one or more components of the network 208. The user device 202 may be said to have a unique identifier, used to exclusively identify the user device (e.g., an Automatic Number Identifier (ANI) when it attempts to or actually connects to the one or more components of the network 208.

In some aspects, the user device 202 can correspond to a computing device 100 in FIG. 1. Thus, a user device can include, for example, a display(s), a power source(s) (e.g., a battery), a data store(s), a speaker(s), memory, a buffer(s), a radio(s) and the like. In some implementations, the user device 202 comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network. Further, the user device 202 may communicate with the node 204 on any one or more frequencies, frequency bands, channels, or the like. Though only the node 204 is depicted in FIG. 2, it should be understood that the user device 202 may be capable of connecting to any one or more of a plurality of nodes, using any one or more of a plurality of communication protocols, on any one or more of a plurality of frequencies.

In some cases, the user device 202 in network environment 200 can optionally utilize network 208 to communicate with other computing devices (e.g., a mobile device(s), a server(s), a personal computer(s), etc.) through the node 204. The network 208 may be a telecommunication network(s), or a portion thereof. A telecommunication network might include an array of devices or components (e.g., one or more base stations, servers, computer processing components), some of which are not shown. Those devices or components may form network environments similar to what is shown in FIG. 2, and may also perform methods in accordance with the present disclosure. Components such as terminals, links, and nodes (as well as other components) can provide connectivity in various implementations. Network 208 can include multiple networks, as well as being a network of networks, but is shown in more simple form so as to not obscure other aspects of the present disclosure.

In aspects, the network 208 can comprise one or more components of a radio access network (RAN). In said aspects, the RAN can be part of a telecommunication network that connects subscribers to their immediate service provider or one or more core networks. For example, the RAN can be associated with a telecommunications provider that provides services (e.g., voice, data, SMS) to user devices, such as user device 202. For example, network 208 may provide voice, SMS, and/or data services to user devices or corresponding users that are registered or subscribed to utilize the services provided by a telecommunications provider. Accordingly, the network 208 may comprise any one or more communication networks providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), a 5G network, or a PSTN.

In some implementations, the node 204 is configured to communicate with user devices, such as the user device 202 that are located within the geographical area, or cell, covered by the one or more antennas of the node 204. Said area may be referred to herein as a geographic coverage area, sector, or the like. Though referred to as a node for simplicity, the node 204 may include (or be communicatively coupled to) one or more base stations, nodes, base transmitter stations, radios, antennas, antenna arrays, power amplifiers, transmitters/receivers, digital signal processors, control electronics, GPS equipment, and the like. In particular, the node 204 may receive a variety of uplink signals from the user device 202 that include requests to access a particular application, service, object, or the like (e.g., an emergency service). These requests may comprise one or more messages using a standardized protocol, such as the Session Initiation Protocol (SIP). SIP is a protocol that is used to establish, maintain, or terminate a session, such as a voice, data, video, or messaging function. As used herein, the term "SIP Invite" is used as a general term, comprising actual SIP Invite messaging according to SIP standards, referring to a request from the user device 202 to one or more components of the network 208 to access a particular service, object, or the like. Further, as the backbone of the RAN, the node 204 facilitates the establishment and maintenance of a connection between the user device 202 and the network 208. In other aspects, such as when the user device 202 is not a wireless telephone (e.g., if the user device 202 is a computer or non-cellular enabled tablet), the node 204 may take the form of a router, modem, or other access point that provides a link between the user device 202 and the network 208.

The network 208 may comprise or be communicatively coupled to one or more components that, together, may be said to comprise a mitigation engine 212 that is utilized, in various implementations, to perform one or methods for mitigating disruptions or denial of service attacks to a telecommunications service (e.g., emergency services such as 911). The mitigation engine 212 can comprise any one or more of a receiver 216, a monitor 218, an analyzer 220, and a controller 222. However, in other implementations, more or less components than those shown in FIG. 2 may be utilized to carry out aspects of the invention described herein. Though shown as coupled to the network 208, the mitigation engine 212 or any of its components or subcomponents may take the form of one or more software stacks, modules, applications, etc., may be executed and/or located at a single location or a plurality of locations, and may executed by one or more network components, or may provide instructions for execution at a location remote to the beam sweeping management engine. As a whole, the mitigation engine 212 operates to receive requests or attempts from the user device 202 to access a service, determine a number of requests or attempts directed to an E11 resource (e.g., 911) within a predetermined geographical area, monitor the number of requests with respect to a utilization threshold indicating a maximum number of requests generated from a geographical area within a predetermined time period that can be handled, and utilizes the utilization threshold to determine if a mitigation protocol should be implemented to prevent the service from being disrupted.

The receiver 216 of the mitigation engine 212 is generally responsible for receiving information and/or indications from various network components and/or user devices that may be relevant for making mitigation decisions. The receiver 216 can receive an indication that the user device 202 has requested access to, or attempted to access, a service (e.g., the user device 202 dialed an access number associated with the service, the user device 202 dialed a prefix, suffix, or used a local application associated with a request for access to the restricted service, or the like). The receiver 216 can receive an indication, separately or as part of the same message comprising the access request, of a unique identifier associated with the user device (e.g., an automatic number identification (ANI)). In aspects where the user device 202 utilizes a wireless connection to access the network 208, the ANI may be obtained from one or more SIP messages or packets.

The receiver 216 can receive one or more indications of a position of a user device, such as the user device 202. The one or more indications of the position of the user device may comprise at least one of a geographic coordinate (i.e., geo-coordinate) and a time that the user device 202 was located at the geographic coordinate. The geographic coordinate may be based on any desirable methodology; for example, the geographic coordinate may be based on or provided by an extra-terrestrial or terrestrial navigation system (e.g., GPS, GLONASS, LORAN, and the like), or it may be based on one or more determinations made by any one or more components of the user device 202, node 204, or network 208, based on information available to them (e.g., network-based location services, triangulation, lines of bearing to a node, time delay location, and the like). The receiver 216 can receive user device position information directly from the user device, or indirectly, via one or more network components 208. The receiver 216 may determine, based on one or more packets or messages communicated from the user device 202 to the network 208 via the node 204, a geographic location of the node 204 that is connected to the user device 202 by comparing a node identifier to a known location of the node 204 (e.g., from a base station almanac). For example, the receiver 216 may determine, by processing a received SIP Invite comprising a P-Access Network Information (PANI) header, the radio access type/ technology (RAT) and a cell identifier (e.g., a Cell Global Identification (CGI)) of the cell that has connected the user device 202 to the network 208, and determine the location of the cell based on a match of the CGI to an entry in the base station almanac. The receiver 216 may communicate the access request, unique device identifier, and/or position information of the user device 202, position of the cell, and any/all other user devices within a desirable geographic area to one or more of the monitor 218, the analyzer 220, or the controller 222.

The monitor 218 of the mitigation engine 212 is generally responsible for compiling the one or more indications received by the receiver 216. The monitor 218 can identify any number of received requests/indications for one or more user devices. The monitor 218 can compile a log or count of requests for each of the one or more devices. The log (or count) of requests can include a time stamp indicating a time of generation of the request. The log/count can also include a location indicator associated with the request and indicating a location from which the request was generated. For instance, the monitor 218 can compile a log of requests associated with one or more user devices attempting to access an E11 service, where each of the one or more devices is within either (i) a predetermined geographical area or (ii) a predetermined distance from at least one of the one or more devices within a predetermined geographical area; and the requests are made within a predetermined time period. The predetermined time period can be a total time period (e.g., within 10 minutes) or can be relative to other requests (e.g., within 1 minute of the last request).

Though primarily discussed with respect to indications and determinations relevant to a single user device, such as user device 202, it is specifically envisioned that the monitor 218 may simultaneously monitor the indications and information discussed herein for a plurality of user devices. The monitor 218 can be configured to provide all or a portion of the monitored indications or compilations of indications to the analyzer 220, the controller 222, or any other component, subcomponent, processor, or software stack of the network 208.

The analyzer 220 is generally responsible for determining whether an attempted denial of service event is occurring, determining a potential mitigation protocol to implement, and communicating the mitigation protocol to the controller 222. The analyzer 220 may determine a service disruption is occurring that should trigger a mitigation protocol using any of the data received and/or compiled by the receiver 216 and/or the monitor 218.

The analyzer 220 may base mitigation protocol decisions, at least in part, on a determination that a utilization threshold is met. A utilization threshold, as used herein, generally describes a maximum number of requests generated, either from a predetermined geographical area or within a predetermined distance from one device to another within the same predetermined geographical area, within a predetermined time period. Once the utilization threshold is met or exceeded, mitigation protocols may be implemented. As described throughout, the predetermined area can be a geographical area (e.g., within a specific region or sector) or can refer to a predetermined distance between one user device and another. For instance, a first user device can generate a request within 50 meters of a second user device.

The analyzer 220 can be configured to monitor the count of requests maintained by, for example, the monitor 218, to determine when the utilization threshold is met or exceeded. If the utilization threshold is not met, no action is taken by the analyzer 220 and the system 200 continues to monitor access requests. When the utilization threshold is satisfied (e.g., the threshold is met or exceeded), the analyzer 220 can determine that a mitigation protocol should be implemented.

Utilization thresholds are dynamic and can be customized based on the particular needs of a location, an E11 resource, and the like. For example, in the event of an actual emergency (i.e., a verified event such as a bridge collapse, a fire, and the like) the utilization thresholds may be lower than in a non-emergent situation. That is, the thresholds may be more stringent and require fewer calls to be generated from a location within a time period before a mitigation protocol is implemented in an actual emergency situation. Further, locale is a determining factor of final utilization thresholds. A region such as New York City will clearly require different utilization thresholds than a remote rural town in Montana. Utilization thresholds can also include a simultaneous request indication identifying a number of requests that can be simultaneously handled that originate within a predetermined distance from one another. For instance, a simultaneous request indication that a resource can handle three simultaneous calls that originate within 50 meters of one another would result in a fourth call originating within 50 meters of any one of the original three calls being subject to a mitigation protocol (e.g., the fourth call may be re-routed). As with any dynamic threshold, the values can be continuously changing such that mitigation protocols can be implemented and removed based on such changes in thresholds, requests received, and the like.

In embodiments, the analyzer 220 filters out known bad actors, such as bots, such that they are not directed to the E11 resource at all. This can be achieved by identifying the identification of the originating user device (e.g., computer) and filtering out those known to be originated by machines instead of humans. Furthermore, customized rules can be created that filter out pre-identified user devices automatically. For instance, a user device that has been identified to place a number of fraudulent requests to an E11 resource can be flagged to be filtered out of E11 requests such that the flagged requests are subject to a mitigation protocol. Such flags can be dynamically managed such that they can be removed upon satisfaction of an unflagging threshold (e.g., a period of time elapses with no calls from the identified source, etc.) or upon an indication of an approved administrator.

In response to a determination by the analyzer 220 that a mitigation protocol should be implemented, the analyzer 220 can determine the details of the protocol to be implemented. Mitigation protocols can include re-routing requests that satisfy the utilization threshold to a destination other than the desired E11 service. The destination other than the desired E11 service (i.e., an alternate destination) can be a voice mail option, a virtual queue where a request is initially directed to an automated resource with an option to wait for a human resource, a virtual queue delivering a pre-recorded message that a number of calls have been received from that area, and the like. Requests can also be blocked altogether such that they are not directed to the E11 service.

One skilled in the art may appreciate that numerous various combinations of triggers and protocols described or similar to those described herein may be desirable in various contexts. The analyzer 220 may communicate the mitigation protocol to the controller 222, wherein the controller can implement the protocol by providing one or more re-routing instructions to one or more components of the network 208 (e.g., a P-CSCF, serving cell, or other suitable component(s)).

Figure 3:
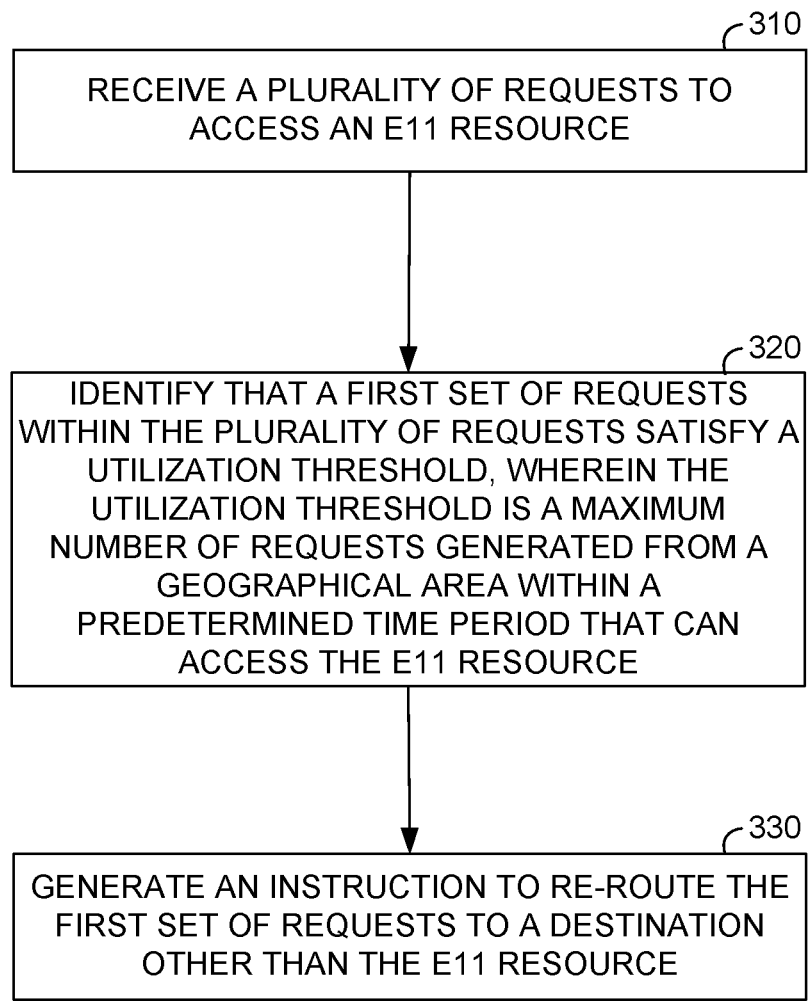
FIG. 3 is a flow diagram of one aspect of a method for mitigating denial of service attacks, in accordance with implementations of the present disclosure.

FIG. 3 depicts a flow diagram of an exemplary method 300 for mitigating denial of service attacks. At block 310, a number of received requests directed to an E11 resource is identified. A first set of requests that satisfy (e.g., meet or exceed) a utilization threshold is identified at block 320. The utilization threshold indicates a maximum number of requests generated from a geographical area within a predetermined time period. Alternately, the utilization threshold indicates a maximum number of requests generated within a predetermined distance from one another within a predetermined time period. At block 330, an instruction is generated to re-route the first set of requests to a destination other than the E11 resource. In embodiments, the instruction can be any mitigation protocol discussed herein such as re-routing, filtering, or blocking requests.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system for mitigating denial of service attacks on services in a communications network, the system comprising:
one or more nodes, each of the one or more nodes configured to wirelessly communicate with one or more user devices in a geographic service area; and
one or more processors configured to perform operations comprising:
receive a plurality of requests from the one or more user devices to access an E11 resource;
determine a coordinated attack threshold for a maximum number of requests being generated from within a geographical area and within a predetermined time period, the maximum number of requests being used to access the E11 resource, the coordinated attack threshold determined based on whether an actual emergency has occurred;
determine that a first set of requests within the plurality of requests are a coordinated attack on the E11 resource by identifying that the first set of requests satisfy the coordinated attack threshold; and
generate an instruction to re-route the first set of requests to a destination other than the E11 resource based the first set of requests being the coordinated attack.

2. The system of claim 1, wherein the destination other than the E11 resource is a virtual queue.

3. The system of claim 2, wherein the virtual queue is an intermediate automated resource.

4. The system of claim 2, wherein the virtual queue is a voice mail box configured to receive one or more messages to be directed to the E11 resource.

5. The system of claim 2, wherein the virtual queue is a pre-recorded message.

6. The system of claim 1, wherein the E11 resource is an emergency 911 service.

7. The system of claim 1, wherein the predetermined time period is less than or equal to five minutes.

8. The system of claim 1, wherein the coordinated attack a utilization threshold further identifies that the first set of requests is generated from a plurality of user devices within a predetermined distance from one another.

9. The system of claim 8, wherein the one or more processors are further configured to maintain a count of requests originating from the geographical area.

10. A non-transitory computer readable media, having instructions stored thereon, that, when executed by one or more processors, cause the one or more processors to carry out a method for mitigating a denial of service attack, the method comprising:
receiving a plurality of requests from one or more user devices to access an E11 resource;
determining a coordinated attack threshold for a maximum number of requests being generated from within a geographical area and within a predetermined time period, the maximum number of requests being used to access the E11 resource, the coordinated attack threshold determined based on whether an actual emergency has occurred;
determining that a first set of requests within the plurality of requests are a coordinated attack on the E11 resource by identifying that the first set of requests satisfy the coordinated attack threshold; and
generating an instruction to re-route the first set of requests to a destination other than the E11 resource based on determining the first set of requests are the coordinated attack.

11. The computer readable media of claim 10, wherein the E11 resource is an emergency 911 service.

12. The computer readable media of claim 10, wherein the destination other than the E11 resource is a virtual queue.

13. The computer readable media of claim 12, wherein the virtual queue is an intermediate automated resource.

14. The computer readable media of claim 12, wherein the virtual queue is a voice mail box configured to receive one or more messages to be directed to the E11 resource.

15. The computer readable media of claim 12, wherein the virtual queue is a pre-recorded message.

16. The computer readable media of claim 10, wherein the predetermined time period is less than or equal to five minutes.

17. The computer readable media of claim 10, wherein the coordinated attack threshold further identifies that the first set of requests is generated from a plurality of user devices within a predetermined distance from one another.

18. The computer readable media of claim 10, wherein the method further comprises maintaining a count of requests originating from the geographical area.

19. A method for mitigating denial of service attacks, the method comprising:
receiving a plurality of requests from user devices to access an E11 resource;
determining that a first set of the plurality of requests from a set of the user devices are a coordinated attack on the E11 resource by identifying that the set of the plurality of requests satisfy a utilization threshold, wherein the utilization threshold indicates a maximum number of requests generated from a geographical area within a predetermined time period and within a predetermined distance from at least one of the set of the user devices that can access the E11 resource; and generating an instruction to re-route the set of the plurality of requests to a destination other than the E11 resource based on determining the set of the plurality of requests are the coordinated attack.

20. The method claim 19, wherein the method further comprises maintaining a count of requests originating from the geographical area.

\* \* \* \* \*